(12) United States Patent
Vilermo et al.

(10) Patent No.: US 10,748,550 B2
(45) Date of Patent: Aug. 18, 2020

(54) METHODS, APPARATUS AND COMPUTER PROGRAMS FOR NOISE REDUCTION FOR SPATIAL AUDIO SIGNALS

(71) Applicant: Nokia Technologies Oy, Espoo (FI)

(72) Inventors: Miikka Vilermo, Sluro (FI); Toni Makinen, Pirkkala (FI); Lasse Laaksonen, Tampere (FI); Anssi Ramo, Tampere (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 16/084,643

(22) PCT Filed: Mar. 20, 2017

(86) PCT No.: PCT/FI2017/050185
§ 371 (c)(1),
(2) Date: Sep. 13, 2018

(87) PCT Pub. No.: WO2017/162915
PCT Pub. Date: Sep. 28, 2017

(65) Prior Publication Data
US 2019/0088267 A1 Mar. 21, 2019

(30) Foreign Application Priority Data
Mar. 24, 2016 (GB) .................................. 1605009.8

(51) Int. Cl.
*G10L 21/00* (2013.01)
*G10L 21/0208* (2013.01)
(Continued)

(52) U.S. Cl.
CPC ...... *G10L 21/0208* (2013.01); *G10L 21/0272* (2013.01); *H04M 7/0048* (2013.01);
(Continued)

(58) Field of Classification Search
CPC ............... G10L 19/008; G10L 21/0208; G10L 21/0272; G10L 2021/02166;
(Continued)

(56) References Cited

U.S. PATENT DOCUMENTS 9,197,974 B1 * 11/2015 Clark .................... H04M 9/08
2010/0278352 A1 11/2010 Petit et al. .................. 381/71.1
(Continued)

FOREIGN PATENT DOCUMENTS

WO WO 2015/179914 A1 12/2015

OTHER PUBLICATIONS

Kowalczyk, Konrad, et al., "Parametric Spatial Sound Processing", IEEE Signal Processing Magazine, Mar. 2015, 12 pages.
Meyer, Joerg, et al., "Multi-Channel Speech Enhancement in a Car Environment Using Wiener Filtering and Spectral Subtraction", IEEE 1997, pp. 1167-1170.

* cited by examiner

*Primary Examiner* — Thierry L Pham
(74) *Attorney, Agent, or Firm* — Harrington & Smith

(57) ABSTRACT

A method, apparatus and computer program including: obtaining a spatial audio signal from a plurality of microphones; dividing the obtained spatial audio signal into at least a first component and a second component; applying a first audio signal optimizing system to the first component and applying a second audio signal optimizing system to the second component; and enabling a signal including the optimized components to be provided to a speaker for rendering.

20 Claims, 12 Drawing Sheets

(51) Int. Cl.
*H04R 3/00* (2006.01)
*H04R 27/00* (2006.01)
*H04S 7/00* (2006.01)
*G10L 21/0272* (2013.01)
*H04M 7/00* (2006.01)
*G10L 21/02* (2013.01)
*G10L 21/0216* (2013.01)

(52) U.S. Cl.
CPC ............. *H04R 3/005* (2013.01); *H04R 27/00* (2013.01); *H04S 7/305* (2013.01); *G10L 2021/02166* (2013.01); *H04R 2227/009* (2013.01); *H04S 2400/15* (2013.01); *H04S 2420/07* (2013.01)

(58) Field of Classification Search
CPC ..... H04M 7/0048; H04R 3/005; H04R 27/00; H04R 2227/009; H04S 7/305; H04S 2420/07; H04S 2400/15
See application file for complete search history.

(56) References Cited

U.S. PATENT DOCUMENTS

| | | | |
|---|---|---|---|
| 2011/0286605 A1 | 11/2011 | Furuta et al. | 381/71.1 |
| 2011/0286609 A1* | 11/2011 | Faller | H04R 3/005 381/92 |
| 2016/0012827 A1* | 1/2016 | Alves | G10K 11/1783 381/71.1 |

METHODS, APPARATUS AND COMPUTER PROGRAMS FOR NOISE REDUCTION FOR SPATIAL AUDIO SIGNALS

This patent application is a U.S. National Stage application of International Patent Application Number PCT/FI2017/050185 filed Mar. 20, 2017, and claims priority to GB application 1605009.8 filed Mar. 24, 2016, which are hereby incorporated by reference in their entireties.

TECHNOLOGICAL FIELD

Examples of the disclosure relate to methods, apparatus and computer programs for noise reduction. In particular they relate to methods, apparatus and computer programs for noise reduction in spatial audio signals.

BACKGROUND

Systems for providing noise reduction in recorded audio signals are known. Such systems may be problematic for use with spatial audio signals as they may distort the recorded signal which may make spatial analysis difficult. In some cases the noise reduction systems may remove all of the ambient noise which may make the recorded signal unsuitable for use in presence systems such as virtual reality systems.

BRIEF SUMMARY

According to various, but not necessarily all, examples of the disclosure, there may be provided a method comprising: obtaining a spatial audio signal from a plurality of microphones; dividing the obtained spatial audio signal into at least a first component and a second component; applying a first audio signal optimizing system to the first component and applying a second audio signal optimizing system to the second component; and enabling a signal comprising the optimized components to be provided to a speaker for rendering.

In some examples the first component may comprise a direct audio component and the second component comprises an ambient audio component. The method may comprise using image data obtained by one or more cameras to enable the direct components in the obtained spatial audio signal to be identified.

The method may comprise using information indicative of the camera currently in use to enable the direct components in the obtained spatial audio signal to be identified.

The first audio signal optimizing system may comprise a first noise reduction system and the second audio signal optimizing system comprises a second noise reduction system. The first noise reduction system and the second noise reduction system may be different. The first noise reduction system may reduce noise by a different amount to the second noise reduction system.

The audio signal optimizing systems may be selected by a user.

The audio signal optimizing systems may be selected by applications being used.

The method may comprise dividing the spatial audio signal into a third component and applying a third audio signal optimizing system to the third component.

According to various, but not necessarily all, examples of the disclosure, there may be provided an apparatus comprising: processing circuitry; and memory circuitry including computer program code, the memory circuitry and the computer program code configured to, with the processing circuitry, enable the apparatus to perform; obtaining a spatial audio signal using a plurality of microphones; dividing the obtained spatial audio signal into at least a first component and a second component; applying a first audio signal optimizing system to the first component and applying a audio signal optimizing system to the second component; and enabling a signal comprising the optimized components to be provided to a speaker for rendering.

In some examples the first component may comprise a direct audio component and the second component may comprise an ambient audio component.

The memory circuitry and the computer program code may be configured to, with the processing circuitry, enable the apparatus to perform using image data obtained by one or more cameras to enable the direct components in the obtained spatial audio signal to be identified.

The memory circuitry and the computer program code may be configured to, with the processing circuitry, enable the apparatus to perform using information indicative of the camera currently in use to enable the direct components in the obtained spatial audio signal to be identified.

The first audio signal optimizing system may comprise a first noise reduction system and the second audio signal optimizing system comprises a second noise reduction system. The first noise reduction system and the second noise reduction system may be different. The first noise reduction system may reduce noise by a different amount to the second noise reduction system.

The audio signal optimizing systems may be selected by a user.

The audio signal optimizing systems may be selected by applications being used by the apparatus.

The memory circuitry and the computer program code may be configured to, with the processing circuitry, enable the apparatus to perform dividing the spatial audio signal into a third component and applying a third audio signal optimizing system to the third component.

According to various, but not necessarily all, examples of the disclosure, there may be provided an electronic device comprising an apparatus as claimed in any of claims 11 to 20.

According to various, but not necessarily all, examples of the disclosure, there may be provided a computer program comprising computer program instructions that, when executed by processing circuitry, enables: obtaining a spatial audio signal using a plurality of microphones; dividing the obtained spatial audio signal into at least a first component and a second component; applying a audio signal optimizing system to the first component and applying a second audio signal optimizing system to the second component; and enabling a signal comprising the optimized components to be provided to a speaker for rendering.

According to various, but not necessarily all, examples of the disclosure, there may be provided a computer program comprising program instructions for causing a computer to perform methods as described above.

According to various, but not necessarily all, examples of the disclosure, there may be provided a physical entity embodying the computer program as described above.

According to various, but not necessarily all, examples of the disclosure, there may be provided an electromagnetic carrier signal carrying the computer program as described above.

According to various, but not necessarily all, examples of the disclosure there may be provided examples as claimed in the appended claims.

BRIEF DESCRIPTION

For a better understanding of various examples that are useful for understanding the detailed description, reference will now be made by way of example only to the accompanying drawings in which:

FIG. 1 illustrates an apparatus;
FIG. 2 illustrates an electronic device comprising an apparatus;
FIG. 3 illustrates a method;
FIG. 4 illustrates a method;
FIG. 5 illustrates a method;
FIG. 6 illustrates a method;
FIG. 7 illustrates an example user interface;
FIG. 8 illustrates a method;
FIG. 9 illustrates a method;
FIG. 10 illustrates a method;
FIG. 11 illustrates an example system; and
FIG. 12 illustrates example layers.

DETAILED DESCRIPTION

The Figures illustrate example methods, apparatus 1 and computer programs 9. In some examples the method comprises obtaining 31 a spatial audio signal 41 from a plurality of microphones 23; dividing 33 the obtained spatial audio signal 41 into at least a first component 45 and a second component 46; applying 35 a first audio signal optimizing system 47 to the first component 45 and applying a second audio signal optimizing system 48 to the second component 46; and enabling 37 a signal comprising the noise optimized components to be provided to a speaker 27 for rendering.

The method may be implemented by one or more apparatus 1. The apparatus 1 may be for enabling spatial audio signals to be recorded and/or enabling spatial audio signals to be rendered. The spatial audio signals may be signals which have directional properties. The spatial audio signals may be signals which enable the directional properties of sounds to be recreated. In some examples the spatial audio signal may comprise a multi-channel audio signal. The multi-channel audio signal may comprise a plurality of channels where each channel may represent a signal obtained by one of the plurality of microphones 23.

FIG. 1 schematically illustrates an example apparatus 1 which may be used in examples of the disclosure. The apparatus 1 illustrated in FIG. 1 may be a chip or a chip-set. In some examples the apparatus 1 may be provided within an electronic device 21 which may be arranged to detect audio signals such as a mobile phone, a camera, a tablet computer, video camera, television, computer or any other suitable electronic device 21.

The example apparatus 1 comprises controlling circuitry 3. The controlling circuitry 3 may provide means for controlling an electronic device 21. The controlling circuitry 3 may also provide means for performing the methods or at least part of the methods of examples of the disclosure.

The processing circuitry 5 may be configured to read from and write to memory circuitry 7. The processing circuitry 5 may comprise one or more processors. The processing circuitry 5 may also comprise an output interface via which data and/or commands are output by the processing circuitry 5 and an input interface via which data and/or commands are input to the processing circuitry 5.

The memory circuitry 7 may be configured to store a computer program 9 comprising computer program instructions (computer program code 11) that controls the operation of the apparatus 1 when loaded into processing circuitry 5.

The computer program instructions, of the computer program 9, provide the logic and routines that enable the apparatus 1 to perform the example methods illustrated in FIGS. 4 to 12. The processing circuitry 5 by reading the memory circuitry 7 is able to load and execute the computer program 9.

In some examples the computer program 9 may comprise an audio signal optimizing application such as a noise reduction application. The audio signal optimizing application may be configured to enable audio signal optimizing systems to be applied to an obtained spatial audio signal. The apparatus 1 therefore comprises: processing circuitry 5; and memory circuitry 7 including computer program code 11, the memory circuitry 7 and computer program code 11 configured to, with the processing circuitry 5, cause the apparatus 1 at least to perform: obtaining 31 a spatial audio signal 41 from a plurality of microphones 23; dividing 33 the obtained spatial audio signal 41 into at least a first component 45 and a second component 46; applying 35 a first audio signal optimizing system 47 to the first component 45 and applying a second audio signal optimizing system 48 to the second component 46; and enabling 37 the optimized components to be provided to a speaker 27 for rendering.

The computer program 9 may arrive at the apparatus 1 via any suitable delivery mechanism. The delivery mechanism may be, for example, a non-transitory computer-readable storage medium, a computer program product, a memory device, a record medium such as a compact disc read-only memory (CD-ROM) or digital versatile disc (DVD), or an article of manufacture that tangibly embodies the computer program. The delivery mechanism may be a signal configured to reliably transfer the computer program 9. The apparatus may propagate or transmit the computer program 9 as a computer data signal. In some examples the computer program code 11 may be transmitted to the apparatus 1 using a wireless protocol such as Bluetooth, Bluetooth Low Energy, Bluetooth Smart, 6LoWPan (IP$_v$6 over low power personal area networks) ZigBee, ANT+, near field communication (NFC), Radio frequency identification, wireless local area network (wireless LAN) or any other suitable protocol.

Although the memory circuitry 7 is illustrated as a single component in the figures it is to be appreciated that it may be implemented as one or more separate components some or all of which may be integrated/removable and/or may provide permanent/semi-permanent/dynamic/cached storage.

Although the processing circuitry 5 is illustrated as a single component in the figures it is to be appreciated that it may be implemented as one or more separate components some or all of which may be integrated/removable.

References to "computer-readable storage medium", "computer program product", "tangibly embodied computer program" etc. or a "controller", "computer", "processor" etc. should be understood to encompass not only computers having different architectures such as single/multi-processor architectures, Reduced Instruction Set Computing (RISC) and sequential (Von Neumann)/parallel architectures but also specialized circuits such as field-programmable gate arrays (FPGA), application-specific integrated circuits (ASIC), signal processing devices and other processing circuitry. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

As used in this application, the term "circuitry" refers to all of the following:

(a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of "circuitry" applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in a server, a cellular network device, or other network device.

FIG. 2 schematically illustrates an example electronic device 21. The example electronic device 21 of FIG. 2 may be configured to enable a spatial audio signal 41 to be detected or otherwise obtained. The example electronic device 21 may enable noise reduction or other audio signal optimization of the detected spatial audio signal.

The electronic device 21 comprises an apparatus 1 as described above. Corresponding reference numerals are used for corresponding features. In addition to the apparatus 1 the example electronic device 21 of FIG. 2 also comprises a plurality of microphones 23, one or more transceivers 25 and one or more speakers 27. In some examples the electronic device 21 may also comprise one or more cameras 29 and a user interface 30. It is to be appreciated that the electronic device 21 may comprise other features which are not illustrated in FIG. 2 such as, a power source or any other suitable features.

The plurality of microphones 23 may comprise any means which enable an audio signal 41 to be detected. The plurality of microphones 23 may enable a spatial audio signal 41 to be detected. The plurality of microphones 23 may comprise any means which may be configured to convert an acoustic input signal to an electrical output signal. The plurality of microphones 23 may be coupled to the apparatus 1 to enable the apparatus 1 to process audio signals detected by the plurality of microphones 23. In some examples the apparatus 1 may process the audio signals by dividing the detected audio signals into a plurality of different components. The different components may comprise one or more direct audio components and one or more ambient audio components. In some examples the apparatus 1 may apply audio signal optimizing systems such as noise reduction systems to the detected audio signals as described below.

The plurality of microphones 23 may be located at any suitable position within the electronic device 21. The microphones 23 may be located at different positions within the electronic device 21 to enable a spatial audio signal to be recorded. One or more of the microphones 23 may be positioned on a different side of the electronic device to one or more of the other microphones 23. For instance, in some examples the electronic device 21 may be a mobile telephone, or other similar device, with one or more microphones 23 located on a front face and one or more microphones 23 located on a rear face.

The one or more transceivers 25 may comprise one or more transmitters and/or receivers. The one or more transceivers 25 may comprise any means which enables the electronic device 21 to establish a communication connection with another electronic device and exchange information with the another electronic device. The communication connection may comprise a wireless connection.

In some examples the one or more transceivers 25 may enable the apparatus 1 to connect to a network such as a cellular network. In some examples the one or more transceivers 25 may enable the apparatus 1 to communicate in local area networks such as wireless local area networks, Bluetooth networks or any other suitable network.

The one or more transceivers 25 may be coupled to the apparatus 1 within the electronic device 21. The one or more transceivers 25 may be configured to receive signals from the apparatus 1 to enable the signals to be transmitted. The signals to be transmitted may comprise the detected spatial audio signal. In some examples the signals to be transmitted may comprise the noise reduced components of the detected spatial audio signal.

The speakers 27 may comprise any means which may be configured to convert an electrical input signal to an acoustic output signal. The speakers 27 may be configured to render the detected spatial audio signals to enable a spatial audio output signal to be provided.

In some examples a plurality of speakers 27 may be provided within the electronic device 21. The plurality of speakers 27 may be arranged to provide multi-channel playback such as binaural, stereo or any other suitable type of audio playback.

In some examples the speakers 27 may be provided within the electronic device 21. For example a mobile telephone may comprise one or more speakers 27 positioned within the casing of the mobile phone. In some examples the speakers 27 may be provided as a peripheral device. For instance a headphone or head set may be coupled to the electronic device 21. In such examples the transceiver 25 may be configured to provide the electronic signals to the headset using a wired or wireless connection.

The example electronic device 21 of FIG. 2 also comprises a camera 29. The camera 29 may comprise any means which enables the electronic device 21 to obtain images. The camera 29 may comprise an image sensor which may be configured to convert light incident on the image sensor into an electrical signal to enable an image to be produced. The image sensors may comprise, for example, digital image sensors such as charge-coupled-devices (CCD) or complementary metal-oxide-semiconductors (CMOS). The images which are obtained may provide a representation of a scene and/or objects which are positioned in front of the camera 29.

In some examples a plurality of cameras 29 may be provided. For instance the electronic device 21 may comprise a rear facing camera and a front facing camera. Different cameras may be used for different applications of the electronic device 21. In some examples the electronic device 21 may comprise an array of cameras 29 which may be arranged to obtain panoramic images.

The cameras 29 may be arranged to obtain still images and/or video images. The camera 29 may be arranged to obtain images at the same time as the microphones 23 detect the spatial audio signal. The images obtained by the camera 29 may comprise objects which are creating part of the detected spatial audio signal.

The cameras 29 may be coupled to the apparatus 1 so that electrical signals comprising captured image information may be provided to the apparatus 1. The apparatus 1 may be configured to perform image processing on the captured image information. This may enable objects in the images to be identified.

The user interface 30 may comprise any means which enables a user to interact with the electronic device 21. The user interface 30 may be configured to provide outputs to the user and enable a user to make user inputs. The user interface 30 may enable a user to make input commands which enable the user to control the electronic device 21.

The user interface 30 may comprise means for providing outputs to a user such as a display. The user interface 30 may also comprise means for enabling a user to make inputs such as a touch pad, a gesture recognition device or any other suitable means. In some examples the means for enabling a user to make inputs may be integrated within the means for providing outputs. For instance the electronic device 21 may comprise a touch sensitive display or other suitable device.

FIG. 3 illustrates an example method which may be implemented using the apparatus 1 and/or electronic device 21 as described above.

The method comprises, at block 31 obtaining a spatial audio signal 41 from a plurality of microphones 23. At block 33 the method comprises dividing the obtained spatial audio signal 41 into at least a first component 45 and a second component 46 and at block 35 the method comprises applying a first audio signal optimizing system 47 to the first component 45 and applying a second audio signal optimizing system 48 to the second component 46. At block 37 the method comprises enabling a signal comprising the optimized components to be provided to a speaker 27 for rendering.

The rendering of the noise reduced components may be enabled by providing a signal comprising the noise reduced components to a speaker 27. In some examples the loudspeaker may be part of the same electronic device 21 as the microphones 23. In some examples the speaker 27 may be provided in a separate device. In such examples the transceiver 25 may be configured to transmit the noise reduced components to enable the signal to be rendered by the separate device.

FIG. 4 illustrates a method in which the obtained audio signal is divided into two components. The example method of FIG. 4 may be performed by an electronic device 21 as described above.

Figure 1:
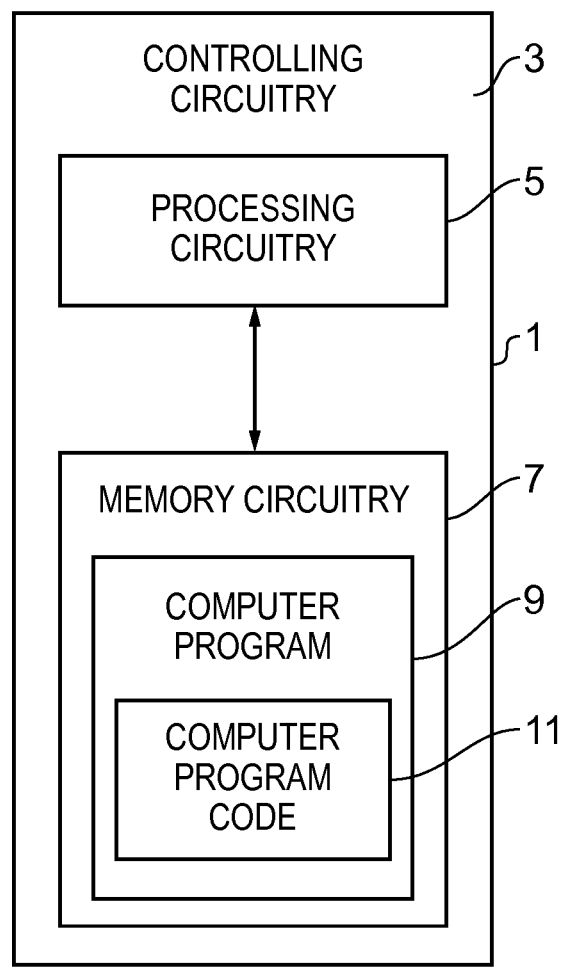
Figure 2:
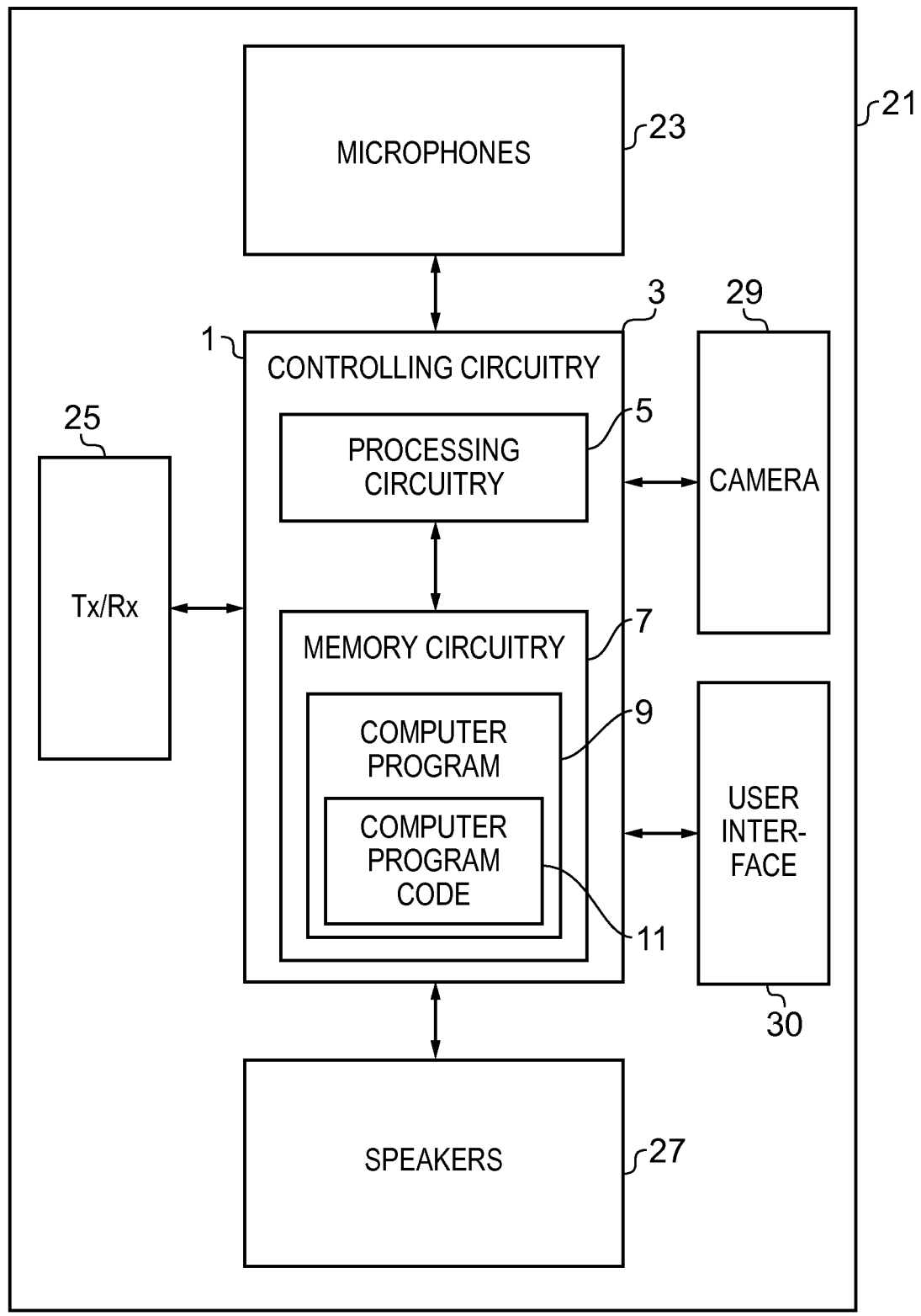
Figure 3:
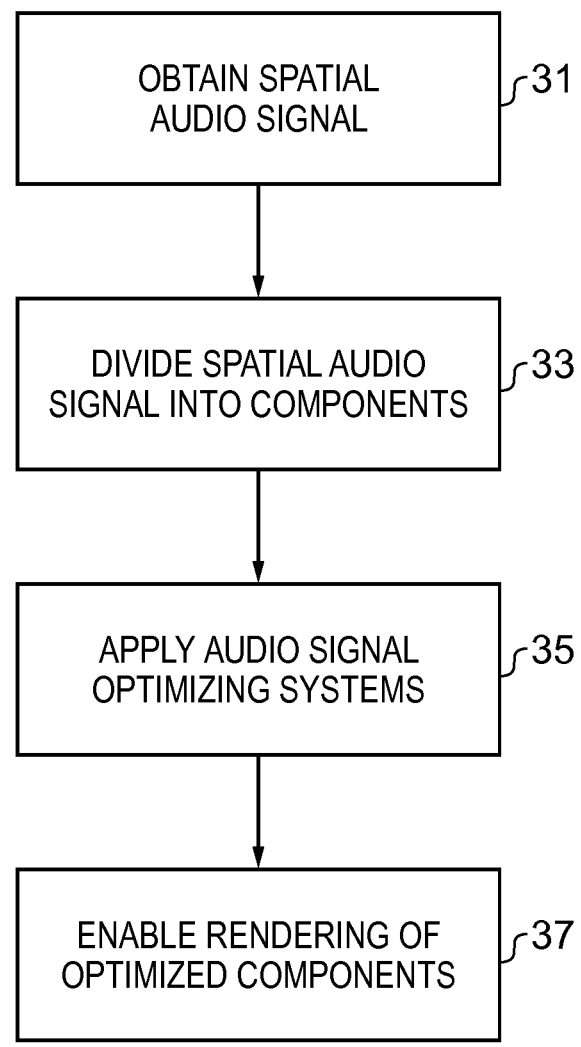
Figure 4:
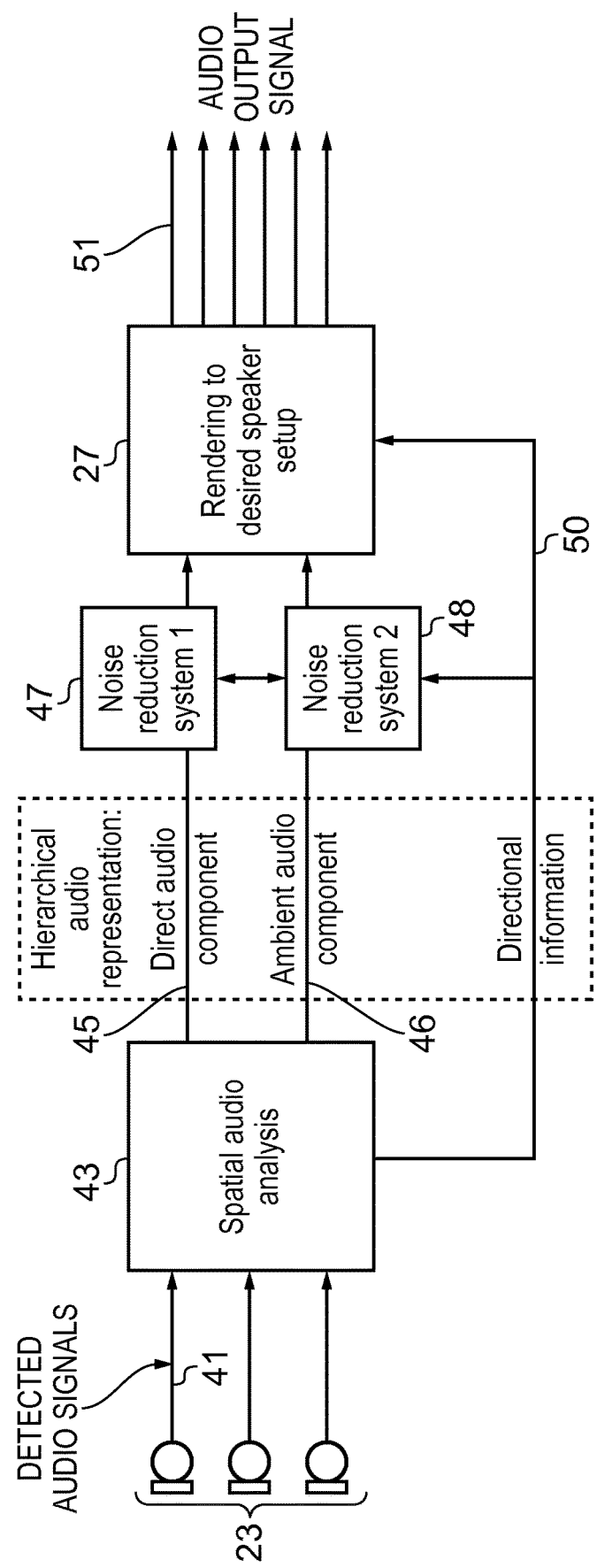
FIGS. 4 to 12 illustrate example methods in further detail.

In the example method of FIG. 4 a plurality of microphones 23 detect a plurality of audio signals 41. In the example of FIG. 4 three microphones 23 are used to detect the audio signals. Other numbers of microphones 23 may be used in other examples of the disclosure. The microphones 23 may be arranged so as to enable a spatial audio signal to be obtained.

The obtained audio signals 41 may be provided to processing circuitry 5 to enable spatial audio analysis 43 to be performed on the obtained audio signals. The spatial audio analysis 43 may comprise any method or process which enables spatial components of the obtained audio signals 41 to be identified. The spatial audio analysis 43 may divide the obtained audio signals 41 into a plurality of components. In some examples the spatial audio analysis 43 may divide the obtained audio signals into hierarchical components. In the example of FIG. 4 the obtained audio signals 41 are divided into two components. In some examples the obtained audio signals may be divided into more than two components.

In the example of FIG. 4 the obtained spatial audio signals 41 are divided into a direct audio component 45 and an ambient audio component 46. The direct audio component 45 may comprise parts of the obtained audio signals 41 that a human listener would perceive as coming from a certain direction. The direct audio components 45 could comprise, for example, speech, singing, instrument noises or any other suitable sounds. The direct audio components 45 may be considered to be the most interesting parts of the obtained audio signal 41 and may comprise the information from the obtained audio signal 41 that a user is most likely to want to hear.

The ambient audio component 46 may comprise signals which a human listener would not perceive as coming from a certain direction. In some examples the ambient audio 46 component may comprise signals which a human listener would perceive to come from all directions. The ambient audio components 46 may comprise background noises such as wind, sea, traffic, crowd noise or other suitable components.

The ambient audio components 46 may be important for some applications such as virtual reality or presence applications where they contribute towards the ambience of the audio output. In other examples the ambient audio components 46 may be undesirable. For instance if the audio signal is being detected for a phone call or other similar communication it may be useful to reduce the ambient audio components 46 to ensure that the speaker can be heard.

Once the direct audio component 45 and the ambient audio component 46 have been obtained noise reductions systems are applied to the components. In the example of FIG. 4 a different noise reduction system is applied to each of the audio components. A first noise reduction system 47 is applied to the direct and audio component 45 and a second noise reduction system 48 is applied to the ambient audio component 46.

The noise reduction systems 47, 48 may comprise any suitable processes and techniques for reducing noise within the components of the obtained audio signals 41.

In some examples the noise reduction systems 47, 48 may comprise a quiet frame method. The quiet frame method may comprise dividing the components 45, 46 of the obtained audio signal 41 into short segments and identifying the quietest frames. In some examples a certain percentage of the quietest frames may be identified. The quietest frames may be assumed to be representative of background noise. The segments may be any suitable length. In some examples the segments may be 20 ms.

An average of the background noise is estimated in frequency domain as the average of the quiet frame energies. The noise in the components 45, 46 of the obtained audio signal 41 is then reduced by subtracting the average background noise, or a portion of the average background noise from all frames in the component 45, 46. The amount of noise reduction may be controlled by varying the portion of the average background noise that is subtracted. For example, if the average of the background noise is multiplied by 0.5 and then subtracted from all the frames this will result in less noise reduction than just subtracting the average.

The quiet frame method may work well with obtained audio signals such as speech signals where there may be pauses which result in quiet frames. Therefore quiet frame methods may be suitable for use in telecommunication, teleconferencing or other similar applications. However the quiet frame method may be unsuitable for use in other applications where the obtained audio signal comprises a steady or constant noise.

In some examples the noise reduction systems 47, 48 may comprise a noise gate method. The noise gate method may comprise dividing the obtained audio signal 41 into short segments and converting these segments into the frequency domain. The segments may be any suitable length. In some examples the segments may be 20 ms.

Once the segments have been converted into the frequency domain any segments that are below a threshold value are zeroed. The threshold value may be predetermined value or may be determined from an average signal value. The average signal values may be obtained for each frequency.

In systems where noise gate methods are used the amount of noise reduction can be changed by changing the threshold. For example strong noise reduction system may use a threshold that is 20 dB below the average signal value and weak noise reduction system may use a threshold that is 30 dB below average signal value. Other threshold values may be used in other examples of the disclosure.

Other noise reduction systems may be used in other examples of the disclosure. In some examples the first noise reduction system 47 and the second noise reduction system 48 may be different. In some examples different methods could be used for the first noise reduction system 47 and the second noise reduction system 48. For instance in some examples the first noise reduction system 47 could comprise the quiet frame method while the second noise reduction system 48 could comprise the noise gate method or any other suitable method. This may allow the noise reduction systems 47, 48 that are used to be optimized for the different types of audio components.

In some examples the first noise reduction system 47 and the second noise reduction system 48 may reduce noise in the audio components by a different amount. For instance the first noise reduction system 47 may be stronger than the second noise reduction system 48 so that the noise in the direct audio component 45 is reduced more than the noise in the ambient audio component 46. The different amounts of noise reduction could be achieved by using different types of noise reduction systems or by using the same type of noise reduction system but with different parameters.

In some examples one of the noise reduction systems 47, 48 may be configured so that no change is made to the noise level of the audio component 45, 46. For instance, in some examples the second noise reduction system 48 may be arranged so that no noise reduction is applied to the ambient audio component 46. This may enable all of the ambient audio component 46 to be retained.

In the example of FIG. 4 the audio signal optimizing systems that are applied to the obtained audio signals are noise reduction systems. It is to be appreciated that other types of audio signal optimizing systems could be applied in other examples of the disclosure. For instance, in some examples the audio signal optimizing system could comprise a filtering system and/or an equalisation system or any other suitable type of system.

Once the noise reductions systems 47, 48 have been applied to the components 45, 46 of the audio signal the a signal comprising the noise reduced components is provided to a speaker 27 for rendering. In some examples a spatial audio signal may be constructed comprising the noise reduced components and provided to a speaker 27 for rendering. The speaker 27 may provide an audio output signal 51. In the example of FIG. 4 the audio output signal 51 comprises six channels. Different numbers of output channels may be used in other examples of the disclosure.

The speaker 27 may also receive directional information 50 from the spatial audio analysis 43. The directional information 50 may comprise information indicative of the perceived direction of the direct audio component 45 and may enable a spatial audio output signal 51 to be provided.

The example method enables both direct audio components 45 and ambient audio components 46 to have noise reduction specific to the use case or the types of signals being recorded. This may enable both the direct audio component 45 and the ambient audio component 46 to be optimized for use in different applications or for different user preferences or for any other purpose. This may be useful for applications such as virtual reality applications where the audio signals may be recorded in 360° and the ambient audio components 46 are important as part of the presence of the system.

In the example of FIG. 4 the number of noise reduction systems 47, 48 is independent of both the number of microphones 23 and the number of channels in the audio output signal 51. In the examples of the disclosure the noise reduction systems 47, 48 are applied to the components 45, 46 of the audio signals and so the number of noise reduction systems 47, 48 needed is determined by the number of components that the obtained audio signal 41 is divided into rather than the number of microphones 23 or the number of output channels.

In the example of FIG. 4 the obtained audio signal 41 is divided into two components and so two noise reduction systems 47, 48 are needed. In other examples the obtained audio signal 41 may be divided into more than two components and so more than two noise reduction systems may be needed. For instance in some examples the obtained audio signal 41 could be divided into a direct audio component 45, an ambient audio component 46 and one or more reverberant components. The reverberant components could be of the direct audio component 45 and/or the ambient audio component 46.

In the example of FIG. 4 the noise reduction systems 47, 48 are applied after the spatial audio analysis 43 has been performed. This may enable more accurate spatial audio analysis 43 to be performed as no noise or other information is removed from the obtained audio signal 41 before the spatial analysis is performed.

Figure 5:
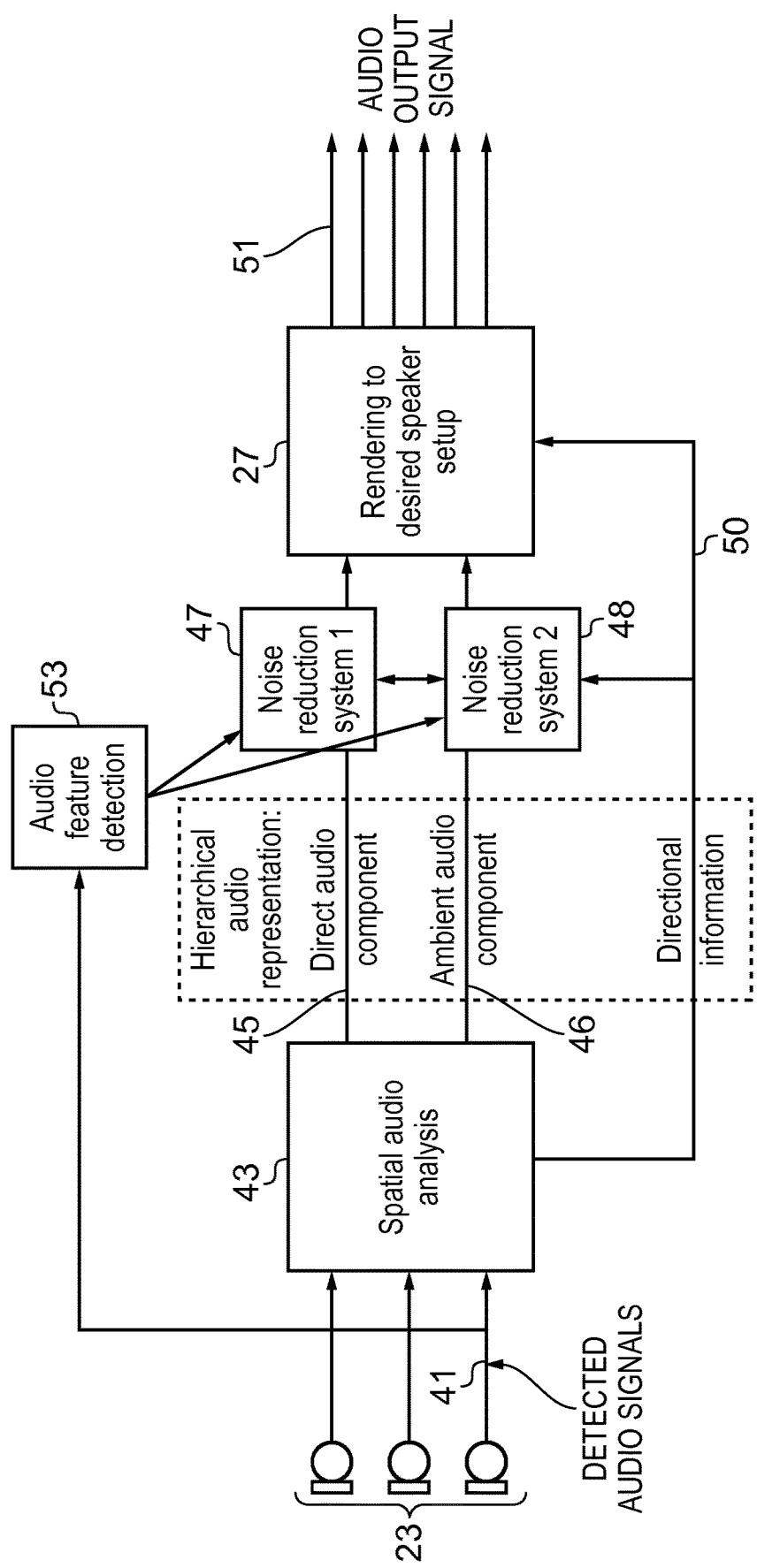

FIG. 5 illustrates another method according to examples of the disclosure. In the example of FIG. 5 audio feature detection is used to control the noise reduction systems 47, 48 that are applied to the audio components 47, 48. The example method of FIG. 5 is similar to the method of FIG. 4 with the addition that the method comprises the block audio feature detection 53 to enable the noise reduction systems 47, 48 to be controlled. Corresponding reference numerals are used for corresponding features.

The audio feature detection 53 may comprise any method or technique which analyses the obtained audio signals 41 to identify features within the obtained audio signal 41. The audio feature detection 53 may detect types of audio features such as steady state or constant sound sources. In some examples the audio feature detection 53 may identify specific audio features such as speech or a particular user speaking.

Once a feature in the obtained audio signal 41 has been identified this information may be used to control the noise reduction systems 47, 48. In some examples once an audio feature or type of audio feature has been identified the noise reduction systems 47, 48 may be selected to optimize the noise reduction for the identified audio features. In some examples the type of noise reduction system 47, 48 may be selected in accordance with the identified audio features. In some examples the amount of noise reduction that is applied may be controlled in accordance with the identified audio features.

In some examples the features identified by the audio feature detection 53 may comprise a feature which provides a constant or steady sound source such as a waterfall or a train engine so that the direct audio component 45 may comprise the sound provided by the constant or steady sound source. In such examples it may be undesirable to reduce the noise within the direct audio component as this may attenuate the identified audio feature 53. In such examples the first noise reduction system 47 may be weaker than the second noise reduction system 48 so that the noise in the ambient audio component 46 is reduced more than the noise in the direct audio component 45.

Any suitable method may be used to determine that the direct audio component 45 comprises constant or steady sound sources. If a direct audio component 45 comprises a constant or steady sound source then there may be very little energy changes between different frames of the direct audio component 45. In some examples the amount of noise in the direct audio component 45 may be determined to identify the features in the direct audio component 45. In some examples a spectral flatness measure may be calculated for the direct audio component 45. If the spectral flatness is above a threshold then the direct audio component 45 may be determined to have a high noise level and may be determined to comprise a constant or steady sound source.

In some examples the spectral flatness may also be calculated for the ambient audio signal. This may enable the noisiness of the ambient audio components 46 to be compared to the noisiness of the direct audio component 45. If the direct audio component 45 has more noise than the ambient audio component 46 then the direct audio component 45 may be determined to comprise a constant or steady sound source.

In some examples the type of audio features identified by the audio feature detection 53 may be used to select the noise reduction systems 47, 48 that are used. For instance if the audio feature detection 53 detects that the direct audio component 45 comprises a constant or steady sound source then quiet frame noise reduction would be unsuitable for use as there would be no quiet frames. In such cases the apparatus 1 may select a different type of noise reduction system to be used with the direct audio component 45. Conversely if the audio feature detection 53 detects that the direct audio component 45 comprises speech components then quiet frame noise reduction would be a suitable system to use as there would be quiet frames. In such cases the apparatus 1 may select quiet frame noise reduction to be used with the direct audio component 45.

In some examples the number of audio features identified by the audio feature detection 53 may be used to select the noise reduction systems 47, 48 that are used. If the audio feature detection 53 detects that there are a small number of audio objects in the obtained audio signals 41 this may be an indication that the obtained audio signals 41 correspond to a landscape recording where a user may be filming and/or recording sounds relating to a landscape. In such examples the noise reduction systems 47, 48 may be selected or adjusted so that weak noise reduction or no noise reduction is applied to both the direct audio component 45 and the ambient audio component 46.

If the audio feature detection 53 detects that there is a large number audio objects in the obtained audio signals 41 this may be an indication that the obtained audio signals correspond to objects that may be of interest to the user such as other people, cars or any other suitable objects. In such examples the direct audio component 45 may be of more interest to the user than the ambient audio component 46. In such examples the noise reduction systems 47, 48 may be selected or adjusted so that weak noise reduction or no noise reduction is applied to both the direct audio component 45 but a large amount of noise reduction is applied to the ambient audio component 46.

The amount of noise reduction that is applied to the ambient audio component 46 may be proportional to the number of audio objects detected so that the higher the number of audio objects detected, the stronger the noise reduction is applied to the ambient audio component.

In some examples the audio feature detection 53 might not reliably identify a feature within the direct audio component 45. For instance, in some examples the audio feature detection 53 might fail to reliably estimate a direction for the direct audio component 45. Any suitable means may be used to determine the reliability of an estimated direction for the direct audio component 45. In some examples a cross correlation value between signals detected by different microphones 23 may be calculated to determine the reliability of an estimated direction. If the correlation value is below a threshold then the estimate of the direction is not considered to be reliable. Such cases may occur during gaps between speech where a speaker or speakers are silent or in situations where only ambient noises occur such as a crowd scene or other environment. In such examples it may be undesirable to apply noise reduction to the direct audio component 45 as this may reduce the clarity of the audio output signal 51. In such cases the first noise reduction system 47 may be arranged to provide no noise reduction or only weak noise reductions so that the original direct audio components 45 may be retained. Retaining the original direct audio components 45 may provide an improved output audio signal 51 for presence capture experiences.

In some examples the audio feature detection 53 may comprise analysis of the ambient audio components 46 to determine if the ambient audio component 46 comprises any audio features that may be of interest to a user. Ambient noise features that may be of interest to a user may comprise sounds such as birds singing or alarm sirens or other sounds that may add to the presence of the audio output signals 51.

Where audio features have been identified in the ambient audio component 46 the second noise reduction system 48 may be arranged to be spectrally filter the ambient audio component 46. The filtering may enhance the clarity of the audio features within the ambient audio component 46. Where the ambient audio component 46 comprises high pitched features such as birds singing or alarm sirens low pass filtering may be performed. Conversely where the ambient audio component 46 comprises low pitched features, such as a running car engine in an echoing parking hall or a distant excavator, high pass filtering may be performed. The filters that are used may be designed so that the attenuation level of the unwanted frequency range is only moderate. In some examples the filters may be designed so that the attenuation level of the unwanted frequency range is adjustable. This may ensure that the original ambient audio features are retained sufficiently to provide an appropriate level of ambient sounds.

Figure 6:
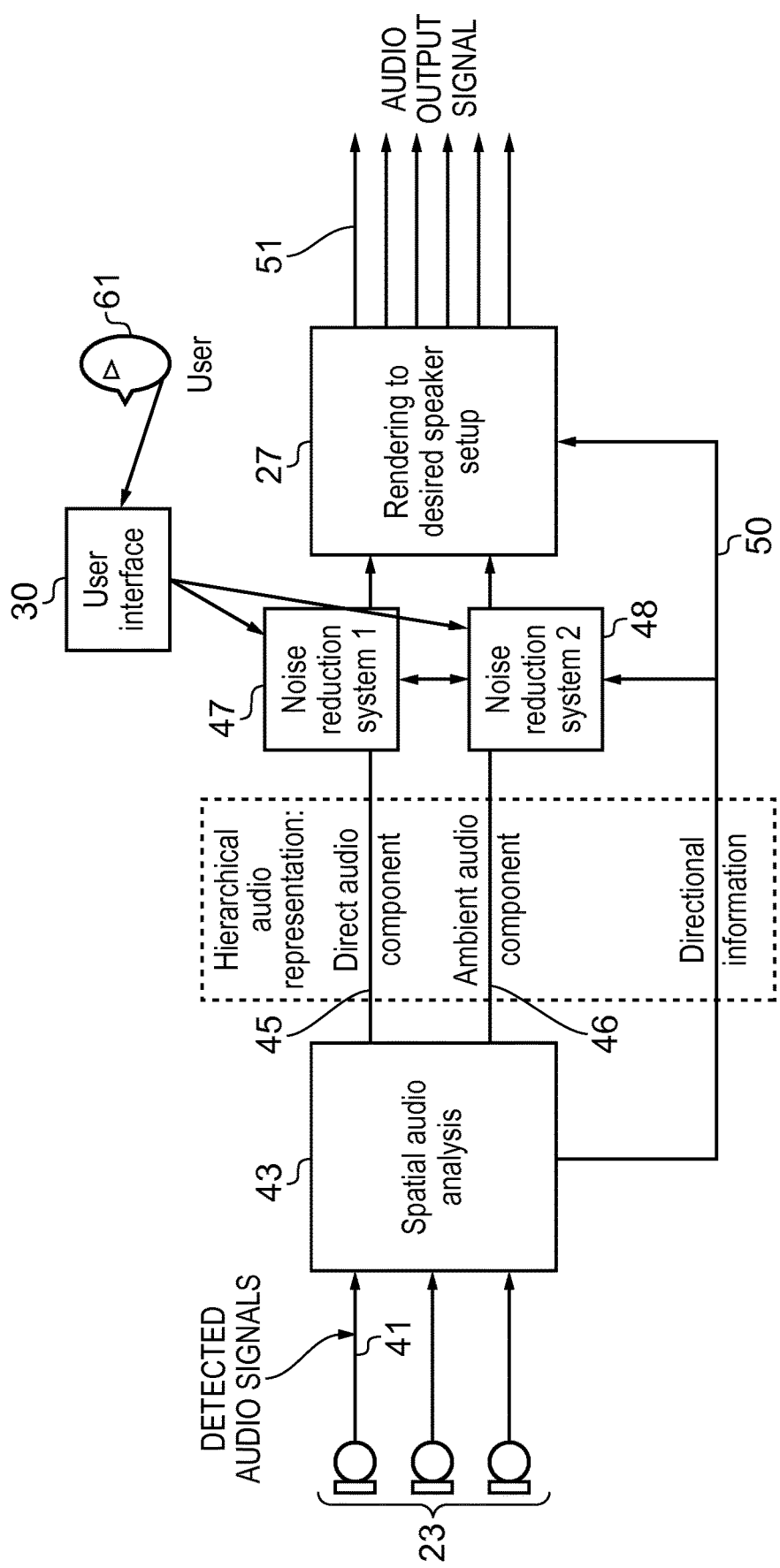

In some examples the noise reduction systems 47, 48 may be selected by a user 61. FIG. 6 illustrates an example method in which a user may control the noise reduction systems 47, 48. The example method of FIG. 6 is similar to the method of FIG. 4 with the addition that the user interface 30 is arranged to enable a user 61 to control the noise reductions systems 47, 48. Corresponding reference numerals are used for corresponding features.

In the example of FIG. 6 a user interface 30 is arranged to enable a user to input commands to an apparatus 1. The user 61 may be the user of the electronic device 21 which is recording the audio signals 41. In some examples the user 61 may be the user of the electronic device 21 which is rendering the audio output signals 51.

In some examples the electronic device 21 may be configured to enable a user to select the type of noise reduction system 47, 48. In some examples the electronic device 21 may be configured to enable the user to select the noise reduction system 47, 48 that is to be applied to each of the components 45, 46. For instance the user interface 30 may be configured to display a menu of available noise reduction systems 47, 48 and detect user selection of one or more of the menu options. In response to the user selection the apparatus 1 may be configured to apply the user selected noise reduction system 47, 48.

In some examples the electronic device 21 may be configured to enable a user to select the amount of noise reduction that is applied. The electronic device 21 may be configured to enable the user to select the amount of noise reduction that is to be applied to each of the components 45, 46. For instance, the user interface 30 may be configured to display a control bar or user selectable icon or other input device which enables a user to select the level of noise reduction to be applied. In response to the user selection the apparatus 1 is configured to apply the user selected level of noise reduction.

As an example the noise reduction systems 47, 48 could have a plurality of available levels. The available levels could range from level 1 to level 5 where level 5 applies the maximum level of noise reduction and level 1 applies the minimum level of noise reduction.

In some examples the five levels could be:

| | |
|---|---|
| Level 1 | no noise reduction in both direct and ambient audio components |
| Level 2 | little noise reduction in direct audio component, no noise reduction in ambient audio component |
| Level 3 | maximum noise reduction in direct audio component, no noise reduction in ambient audio component |
| Level 4 | maximum noise reduction in direct audio component, little noise reduction in ambient audio component |
| Level 5 | maximum noise reduction in both direct and ambient audio components |

The user interface 30 may be arranged to enable a user to select one of the five levels and in response to the user selection the apparatus 1 is configured to implement the noise reduction systems 47, 48 in accordance with the selected level.

It is to be appreciated that any number of levels could be provided in other examples of the disclosures and any suitable arrangements of the noise reduction systems 47, 48 could be associated with each of the respective components.

In the example described above the noise reduction systems 47, 48 applied to both the direct audio component 45 and the ambient audio component 46 are controlled simultaneously. In other examples the noise reduction system 47, 48 applied to both the direct audio component 45 and the ambient audio component 46 may be controlled separately.

In some examples the electronic device 21 may have a plurality of applications. For example an electronic device 21 such as a mobile telephone may have telecommunications or teleconferencing applications which enable video images and sound to be recorded for transmission to another device. The mobile telephone may also have a plurality of cameras which may be used to obtain video images in a video recording application. The user interface 30 may be configured to enable the user 61 to select different noise reduction systems 47, 48 and/or different levels of noise reduction for different applications.

In some examples each application may have a default noise reduction setting. The user interface 30 may be configured to enable the user to control the settings of the noise reduction systems 47, 48 to their preferred levels. The available settings may be different for different applications.

As an example, if the application in use is a telecommunication application this may be an indication that speech may be recorded. In such examples a high level of noise reduction for both the ambient audio components 46 and the direct audio components 45 may be selected. If the application in use is a video recording application then low levels of noise reduction for both the ambient audio components 46 and the direct audio components 45 may be selected. This may ensure that the recorded video can be used in virtual reality or presence applications.

Figure 7:
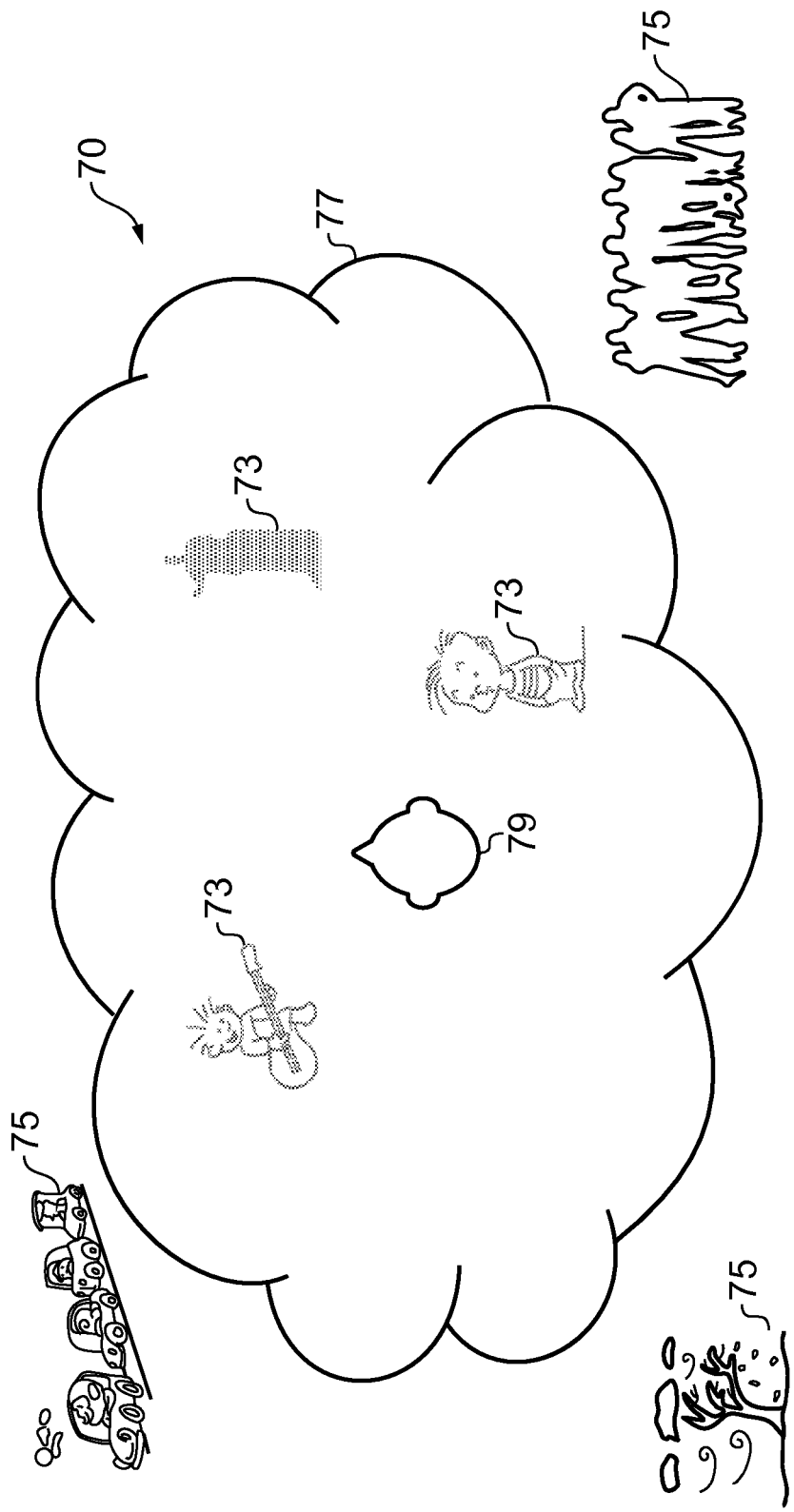

FIG. 7 illustrates an example graphical user interface 71 which may be used to implement the example method of FIG. 6. The graphical user interface 71 may be displayed on a touch sensitive display which may be provided as part of the user interface 30.

The example graphical user interface 71 comprises graphical representations 73 of direct audio components 45 and graphical representations 75 of ambient audio components 46. The graphical representations 73, 75 are displayed in a manner which enables the user 61 to distinguish between the direct audio components 45 and the ambient audio components 46. In the example of FIG. 7 the graphical representations 73 of the direct audio components 45 are displayed within a boundary 77 and the graphical representations 75 of the ambient audio components 46 are displayed on the outside of the boundary 77. In the example of FIG. 7 the boundary 77 is a cloud outline. Other types of boundary 77 or means for enabling a user to distinguish between the direct audio components 45 and the ambient audio components 46 may be used in other examples of the disclosure.

In the example of FIG. 7 a graphical representation 79 of the user 61 is also displayed. The graphical representation 73 of the direct audio components 45 may be displayed in positions relative to the graphical representation 79 of the user 61 to correspond to the identified directions of the direct audio components 45. This may make it easier for a user to select the amount of noise reduction that they would like to apply.

The user interface 30 may be configured to enable a user 61 to control the amount of noise reduction that is applied to each of the direct audio components 45 and the ambient audio components 46 by making a user input in the area in which the graphical representations 73, 75 are displayed. For instance a user 61 could make a pinch out gesture to increase the amount of noise reduction that is applied or a pinch in gesture to reduce the amount of noise reduction.

In the example of FIG. 7 the brightness of the graphical representations 73 of the direct audio components 45 have been reduced which indicates that the user 61 has selected low noise reduction for the direct audio components. The brightness of the graphical representations 75 of the ambient audio components 46 have been increased which indicates that the user 61 has selected a high noise reduction for the ambient audio components 46.

Figure 8:
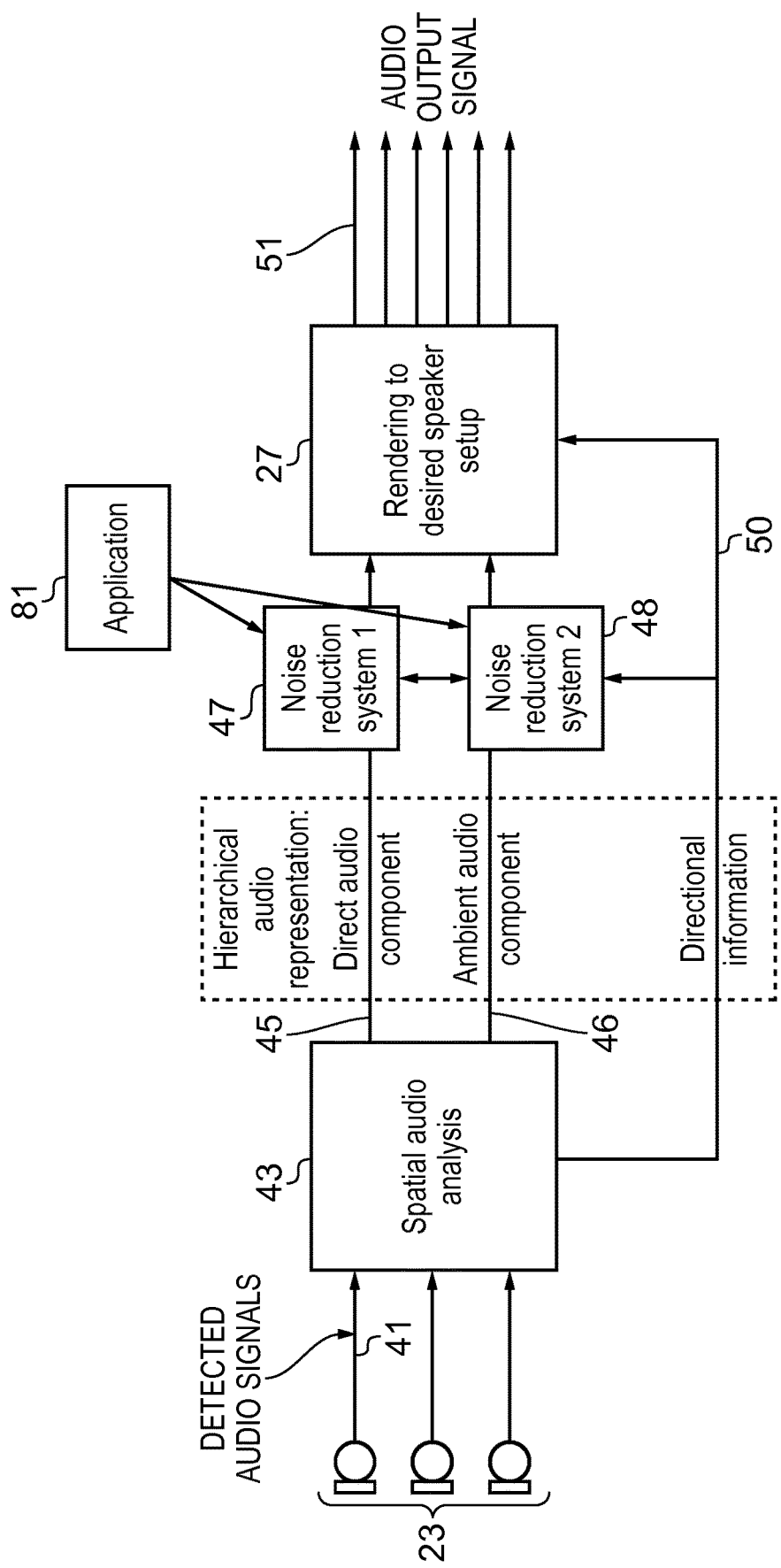

In some examples the noise reduction systems 47, 48 may be selected in accordance with one or more applications that are currently being used by the electronic device 21. FIG. 8 illustrates an example method in which the noise reduction systems 47, 48 are selected based on the applications that are in use. The example method of FIG. 8 is similar to the method of FIG. 4 with the addition that the noise reduction systems 47, 48 are selected based on the applications that are in use. Corresponding reference numerals are used for corresponding features.

At block 81 in the method of FIG. 8 the applications currently in use by the electronic device 21 are identified. Once the applications in use have been identified the optimum type of noise reduction system 47, 48 and/or the optimum level of noise reduction for that application may be identified. Once the type of noise reduction system 47, 48 and/or the level of noise reduction have been identified the apparatus 1 may control the electronic device 21 to provide the selected level of type and/or level of noise reduction. It is to be appreciated that different types and/or levels of noise reduction may be provided to the different audio components 45, 46 in accordance with the applications that have been identified.

In some examples the noise reduction systems 47, 48 may be selected automatically in dependence upon the applications of the electronic device 21 that are in use. The automatic selection may occur without any specific user input.

As an example, it may be detected that a teleconferencing or telephony application may be in use. It may be identified that the optimum noise reduction for such applications is a high level of noise reduction that enables intelligibility of the detected speech signals to be improved. The types of noise reduction systems 47, 48 and the levels of noise reduction system may be selected to provide a high level of noise reduction. In such examples the noise reduction systems 47, 48 may comprise bandpass filtering which filters frequencies found in speech. The frequencies that are filtered could be in the range 400 Hz-4 kHz. The level of noise reduction may be higher for the ambient audio components 46 than for the direct audio components 45.

As another example it may be detected that an application such as video recording, virtual reality capture, telepresence or other similar application is in use. In such examples the ambient audio components 46 may comprise sounds such as wind, traffic and crowds which may provide atmosphere in the obtained audio signal 41. In such cases it may be desirable to optimize the noise reduction systems 47, 48 for general audio signals. It may be identified that the optimum noise reduction for such applications is for the direct audio component 45 to have a higher level of noise reduction than the ambient audio component 46 so that the atmosphere of the obtained audio signal 41 is retained.

Figure 9:
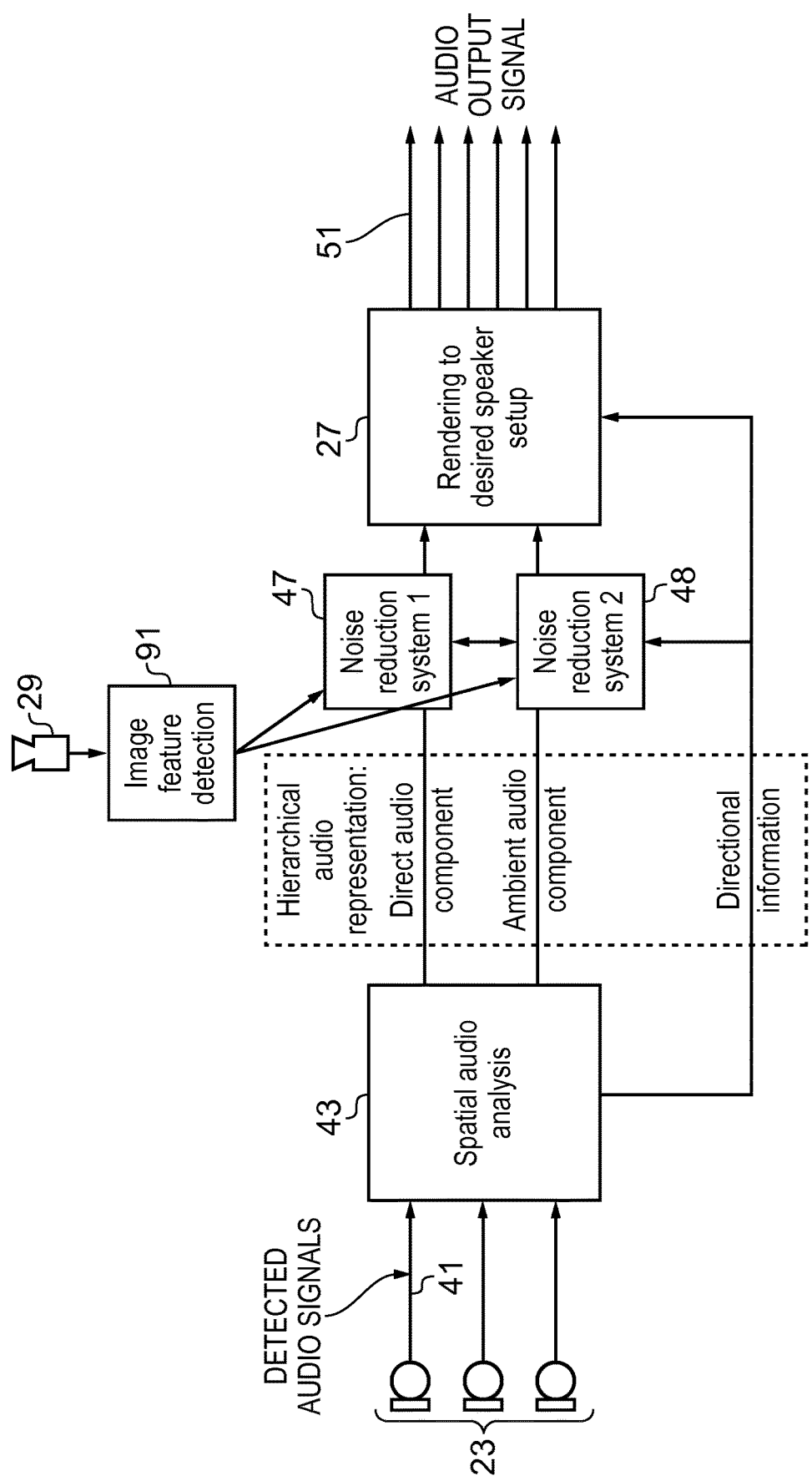

FIG. 9 illustrates an example method in which the noise reduction systems 47, 48 are selected based on image feature detection. The example method of FIG. 9 is similar to the method of FIG. 4 with the addition that the noise reduction systems 47, 48 are selected based on the image feature detection. Corresponding reference numerals are used for corresponding features.

At block 91 in the method of FIG. 9 image feature detection is performed. The image feature detection may comprise analyzing images obtained by one or cameras 29 to identify possible sound sources. Any suitable image recognition processes may be used to analyse the obtained images. The images may comprise still images or video images or any other suitable types of images.

Once one or more objects in the images have been identified the optimum type of noise reduction system 47, 48 and/or the optimum level of noise reduction for the types of sounds generated by such objects may be identified. Once the type of noise reduction system 47, 48 and/or the level of noise reduction have been identified the apparatus 1 may control the electronic device 21 to provide the selected level of type and/or level of noise reduction. It is to be appreciated that different types and/or levels of noise reduction may be provided to the different audio components 45, 46 in accordance with the objects that have been identified.

For instance if it is identified that the electronic device 21 is being used to film a person it is likely that the sound being recorded comprises speech. In such cases the noise reduction systems 47, 48 may be selected to optimize the noise reduction for speech applications.

In some examples the image feature detection may enable moving objects to be identified in obtained video images. If no moving objects are identified this may be an indication that the video images are landscape images and the noise reduction systems 47, 48 may be optimized for landscape video recordings. The noise reduction systems 47, 48 may comprise a low level of noise reduction for both the direct audio component 45 and the ambient audio component 46.

If there are some moving objects identified in the video images than the noise reduction systems 47, 48 may be optimized for the identified moving objects. If moving objects are detected close to the camera 29 this could be an indication that the user 61 is filming an object such as a person or a vehicle or other type of object. In such cases the ambient audio component 46 may be less important than the direct audio component 45. In such cases a high level of noise reduction may be applied to both the ambient audio components 46 and the direct audio components 45. The noise reduction applied to the ambient audio component 46 may be greater than the noise reduction applied to the direct audio component 45.

In some examples the noise reduction that is applied may be controlled based on the number of moving objects and the position of the objects relative to the camera 29. The noise reduction may be increased if the number of moving objects increases and may be decreased if the number of moving objects decreases. The noise reduction may be increased as an object moves closer to a camera 29 and may decrease as the object moves away from the camera 29.

In some examples information indicative of the camera 29 in use may be used to select the noise reduction systems 47, 48. For instance, the electronic device 21 may comprise a first camera 29 mounted on a front face of the electronic device 21 and a second camera 29 mounted on the rear face of the electronic device 21. If it is detected that the camera 29 mounted on the rear face is being used for video recording then it may be determined that the user 61 is filming a landscape or area in which the ambient sounds may be important. In such cases, low levels of noise reduction may be applied to both the direct audio component 45 and the ambient audio component 46. If it is detected that the camera 29 mounted on the front face is being used for video recording then it may be determined that the user 61 is filming themselves. For instance, they may be using a telecommunication application. In such cases, high levels of noise reduction may be applied to both the direct audio component 45 and the ambient audio component 46 so that any speech signals can be provided clearly.

In some examples information about the camera 29 in use may be used in combination with further information obtained by the electronic device 21 to control the noise reduction systems 47, 48. For instance, the directional information about the obtained audio signals 41 may be used, in combination with information about the camera 29 currently in use, to determine the types of noise reduction systems 47, 48 to be used. As an example, it may be detected that the camera 29 mounted on the rear face is currently in use but the directional information about the obtained audio signals 41 indicates that the direct audio components are mainly coming from the front face side of the electronic device 21. In such cases it may be determined that the user 61 is recording a video but is providing commentary on the video. In such cases the noise reduction systems 47, 48 may be optimized for the user's commentary. This may comprise strong noise reduction systems for both direct audio components 45 and ambient audio components 46.

Figure 10:
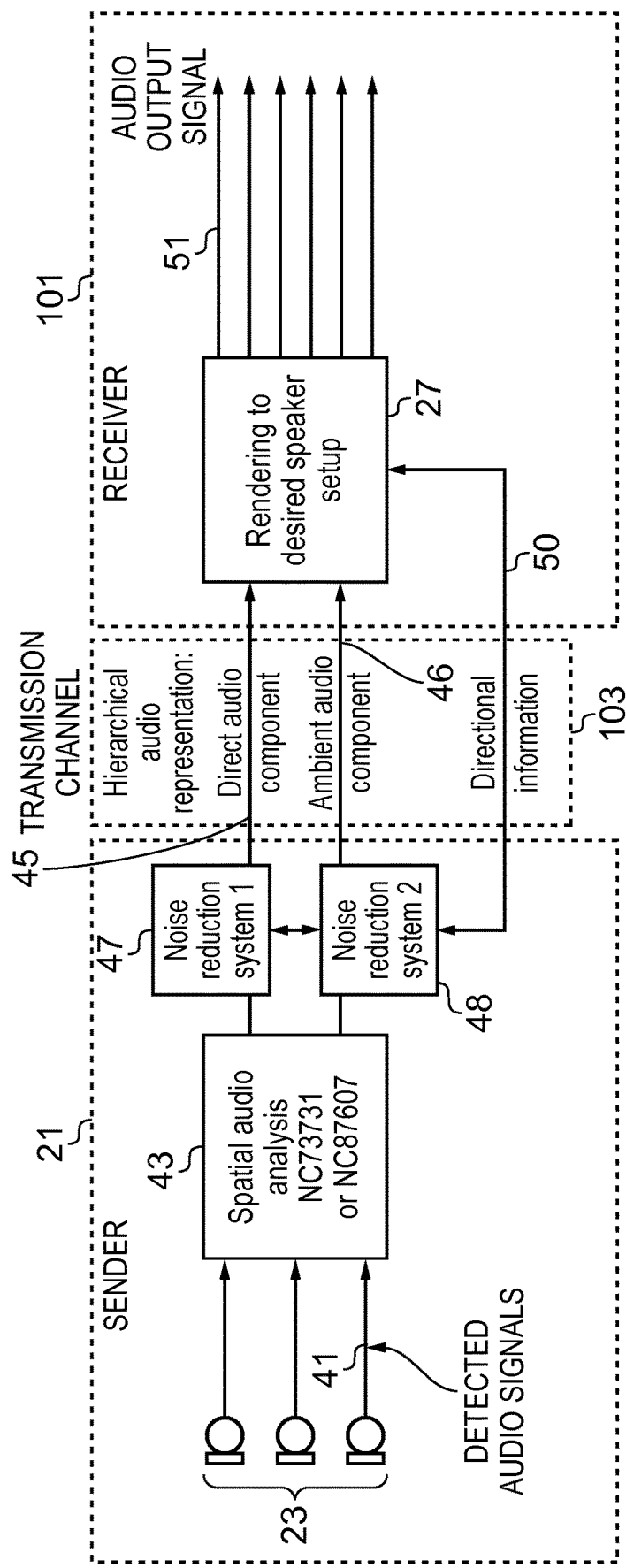

FIG. 10 illustrates a method where the audio signals are detected by a first electronic device 21 and the obtained audio signals 41 are then transmitted to another electronic device 101 for rendering by a speaker 27 and/or storage in memory circuitry 5.

In the example of FIG. 10 the noise reduction systems 47, 48 are applied to the direct and ambient audio components 45, 46 by the first electronic device 21 before the signal is transmitted to the another electronic device 101. In other examples the direct and ambient audio components 45, 46 could be transmitted before the noise reduction systems 47, 48 are applied so that the noise reduction systems 47, 48 can be applied by the another electronic device 101.

The signals may be transmitted from the electronic device 21 to the another electronic device 101 via a transmission channel 103. The transmission channel may comprise a wired or wireless connection established between the transceiver 25 of the first electronic device 21 and the transceiver 25 of the another electronic device 101.

Any suitable means may be used to encode the signals before they are transmitted from the electronic device 21 to the another electronic device 101. In some examples the signals may be encoded using mp3, AAC or any other suitable codec.

Figure 11:
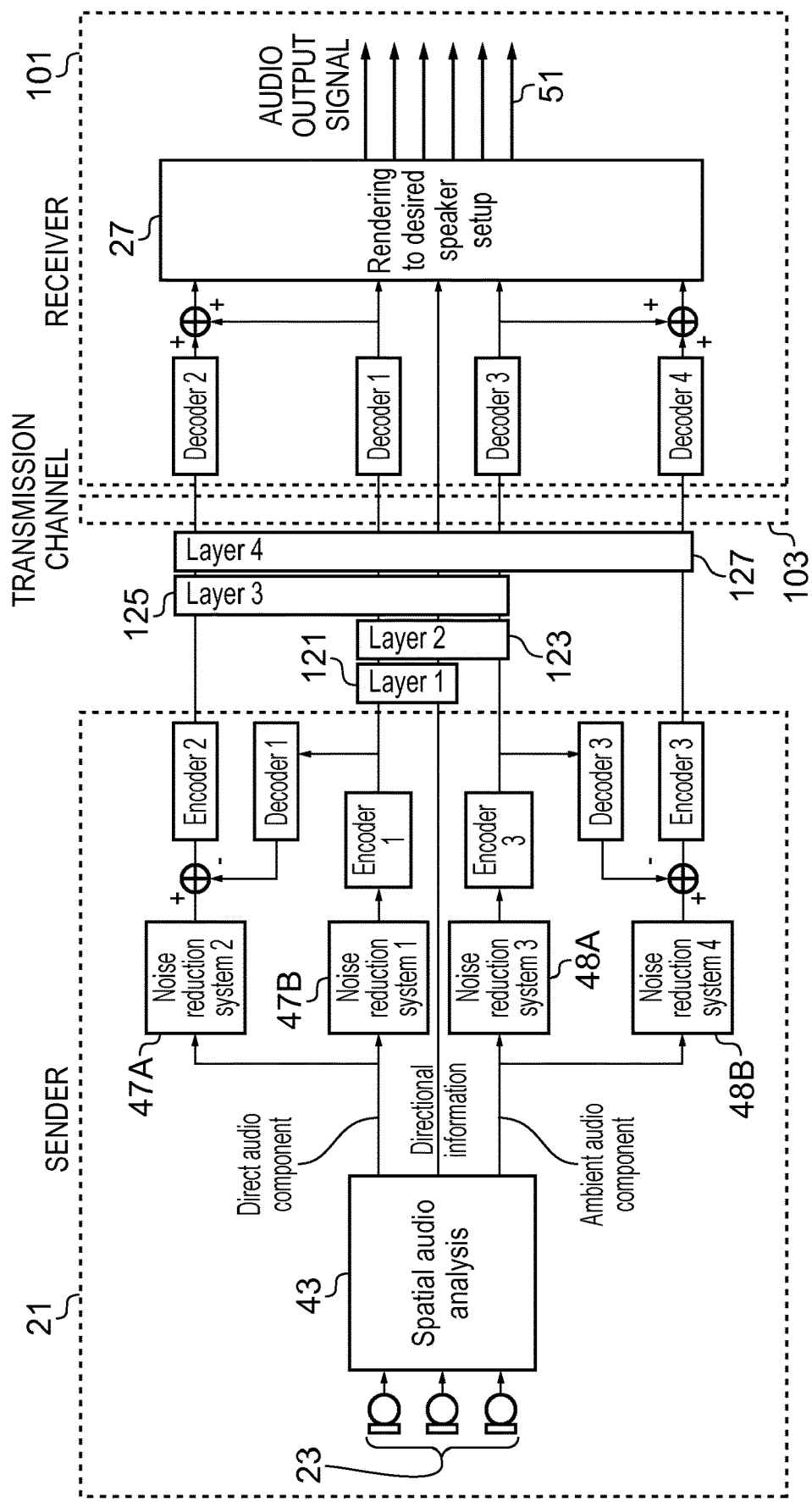

FIG. 11 illustrates an example system in which a plurality of different noise reduction systems 47, 48 are applied to the direct and ambient components 45, 46. The different direct and ambient components 45, 46 with different levels of noise reduction can then be transmitted from the electronic device 21 to the another electronic device 101 in a plurality of layers.

In the example of FIG. 11 two different noise reduction systems 47A, 47B are applied to the direct audio component 45. One of the noise reduction systems 47A may provide a high level of noise reduction and the other noise reduction system 47B may apply a low level of noise reduction. Similarly in FIG. 11 two different noise reduction systems 48A, 48B are applied to the ambient audio component 46. One of the noise reduction systems 48A may provide a high level of noise reduction and the other noise reduction system 48B may apply a low level of noise reduction. This may enable different levels of noise reduction to be provided to the another electronic device 101 so that the noise reduction can be adjusted by the another electronic device 101.

In the example of FIG. 11 embedded coding is used to send the plurality of different layers from the electronic device 21 to the another electronic device 101. The lower layers may have a low bitrate and a low level of complexity and the higher layers may have a high bitrate and a high level of complexity.

Figure 12:
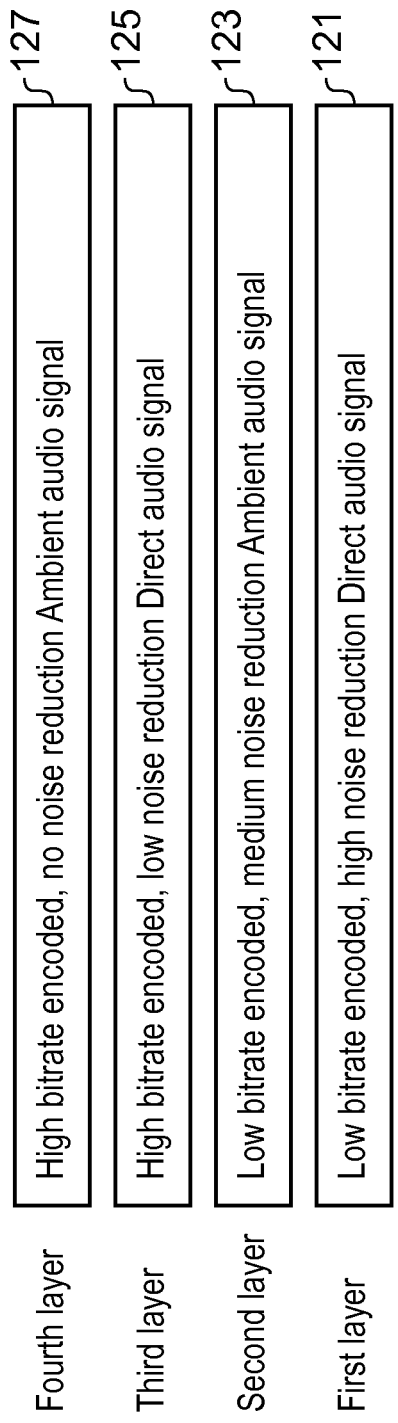

In the example of FIG. 11 each layer of the encoder comprises a different signal. FIG. 12 illustrates example layers. The first layer 121 may comprise a low bitrate layer which has high noise reduction for the direct audio component 45. The second layer 123 may comprise a low bitrate layer which has medium noise reduction for the ambient audio component 46. The third layer 125 may comprise a high bitrate layer with low noise reduction for the direct audio component 45. The fourth layer 127 may comprise a high bitrate layer which has no noise reduction for the ambient audio component 46. Other arrangements of layers may be used in other examples of the disclosure.

The term "comprise" is used in this document with an inclusive not an exclusive meaning. That is any reference to X comprising Y indicates that X may comprise only one Y or may comprise more than one Y. If it is intended to use "comprise" with an exclusive meaning then it will be made clear in the context by referring to "comprising only one . . . " or by using "consisting".

In this brief description, reference has been made to various examples. The description of features or functions in relation to an example indicates that those features or functions are present in that example. The use of the term "example" or "for example" or "may" in the text denotes, whether explicitly stated or not, that such features or functions are present in at least the described example, whether described as an example or not, and that they can be, but are not necessarily, present in some of or all other examples. Thus "example", "for example" or "may" refers to a particular instance in a class of examples. A property of the instance can be a property of only that instance or a property of the class or a property of a sub-class of the class that includes some but not all of the instances in the class. It is therefore implicitly disclosed that a features described with reference to one example but not with reference to another example, can where possible be used in that other example but does not necessarily have to be used in that other example.

Although embodiments of the present invention have been described in the preceding paragraphs with reference to various examples, it should be appreciated that modifications to the examples given can be made without departing from the scope of the invention as claimed. For instance in the above the described examples all of the microphones used are real microphones. In some examples the one or more of the microphones used for obtaining a beamforming signal could be a virtual microphone, that is, an arithmetic combination of at least two real microphone signals.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

We claim:

1. A method comprising:
obtaining a spatial audio signal from a plurality of microphones;
determining at least a first component of the obtained spatial audio signal and at least a second component of the obtained spatial audio signal, wherein the first component comprises a direct audio component and the second component comprises an ambient audio component;
applying a first adjustment process to the first component and applying a second adjustment process to the second component; and
enabling a processed version of the spatial audio signal to be provided to one or more speakers for rendering, wherein the processed version of the spatial audio signal comprises the processed first component and the processed second component.

2. A method as claimed in claim 1, further comprising using image data obtained with one or more cameras to enable the direct audio component in the obtained spatial audio signal to be identified.

3. A method as claimed in claim 1, further comprising using information indicative of a camera currently in use to enable the direct audio component in the obtained spatial audio signal to be identified.

4. A method as claimed in claim 1, wherein the first adjustment process comprises a first noise reduction system and the second adjustment process comprises a second noise reduction system.

5. A method as claimed in claim 4, wherein the first noise reduction system and the second noise reduction system are different.

6. A method as claimed in claim 4, wherein the first noise reduction system reduces noise with a different amount to the second noise reduction system.

7. A method as claimed in claim 1, wherein the first adjustment process and the second adjustment process are selected based, at least partially, on at least one of:
a user;
one or more characteristics of the obtained spatial audio signal;
a received video signal;
a selected camera; or
one or more applications being used.

8. A method as claimed in claim 1, further comprising determining a third component of the obtained spatial audio signal and applying a third adjustment process to the third component.

9. An apparatus comprising:
processing circuitry; and
non-transitory memory circuitry including computer program code, the memory circuitry and the computer program code configured to, with the processing circuitry, enable the apparatus to perform:
obtain a spatial audio signal using a plurality of microphones;
determine at least a first component of the obtained spatial audio signal and at least a second component of the obtained spatial audio signal, wherein the first component comprises a direct audio component and the second component comprises an ambient audio component;
apply a first adjustment process to the first component and apply a second adjustment process to the second component; and
enable a processed version of the spatial audio signal to be provided to one or more speakers for rendering, wherein the processed version of the spatial audio signal comprises the processed first component and the processed second component.

10. An apparatus as claimed in claim 9, wherein the memory circuitry and the computer program code are configured to, with the processing circuitry, enable the apparatus to perform:
use image data obtained with one or more cameras to enable the direct audio component in the obtained spatial audio signal to be identified.

11. An apparatus as claimed in claim 9, wherein the memory circuitry and the computer program code are configured to, with the processing circuitry, enable the apparatus to perform:
use information indicative of a camera currently in use to enable the direct audio component in the obtained spatial audio signal to be identified.

12. An apparatus as claimed in claim 9, wherein the first adjustment process comprises a first noise reduction system and the second adjustment process comprises a second noise reduction system.

13. An apparatus as claimed in claim 12, wherein the first noise reduction system and the second noise reduction system are different.

14. An apparatus as claimed in claim 12, wherein the first noise reduction system reduces noise with a different amount to the second noise reduction system.

15. An apparatus as claimed in claim 9, wherein the first adjustment process and the second adjustment process are selected based, at least partially, on at least one of:
a user;
one or more characteristics of the obtained spatial audio signal;
a received video signal;
a selected camera; or
one or more applications being used with the apparatus.

16. An apparatus as claimed in claim 9, wherein the memory circuitry and the computer program code are configured to, with the processing circuitry, enable the apparatus to perform:
determine a third component of the obtained spatial audio signal and apply a third adjustment process to the third component.

17. A computer program embodied on a non-transitory computer-readable storage medium comprising computer program instructions that, when executed with processing circuitry, causes the processing circuitry to perform:
obtain a spatial audio signal using a plurality of microphones;
determine at least a first component of the obtained spatial audio signal and at least a second component of the obtained spatial audio signal, wherein the first component comprises a direct audio component and the second component comprises an ambient audio component;
apply a first adjustment process to the first component and apply a second adjustment process to the second component; and
enabling a processed version of the spatial audio signal to be provided to one or more speakers for rendering, wherein the processed version of the spatial audio signal comprises the processed first component and the processed second component.

18. An apparatus as claimed in claim 9, where in the apparatus is an electronic device.

19. A method as claimed in claim 8, wherein the third component comprises a reverberant component.

20. An apparatus as claimed in claim 16, wherein the third component comprises a reverberant component.

* * * * *